Sept. 17, 1946.  W. A. BAILEY, JR., ET AL  2,407,914
CATALYTIC CONVERSION OF HYDROCARBONS AND
THE PREPARATION OF CATALYSTS THEREFOR
Filed Aug. 22, 1944   4 Sheets-Sheet 4
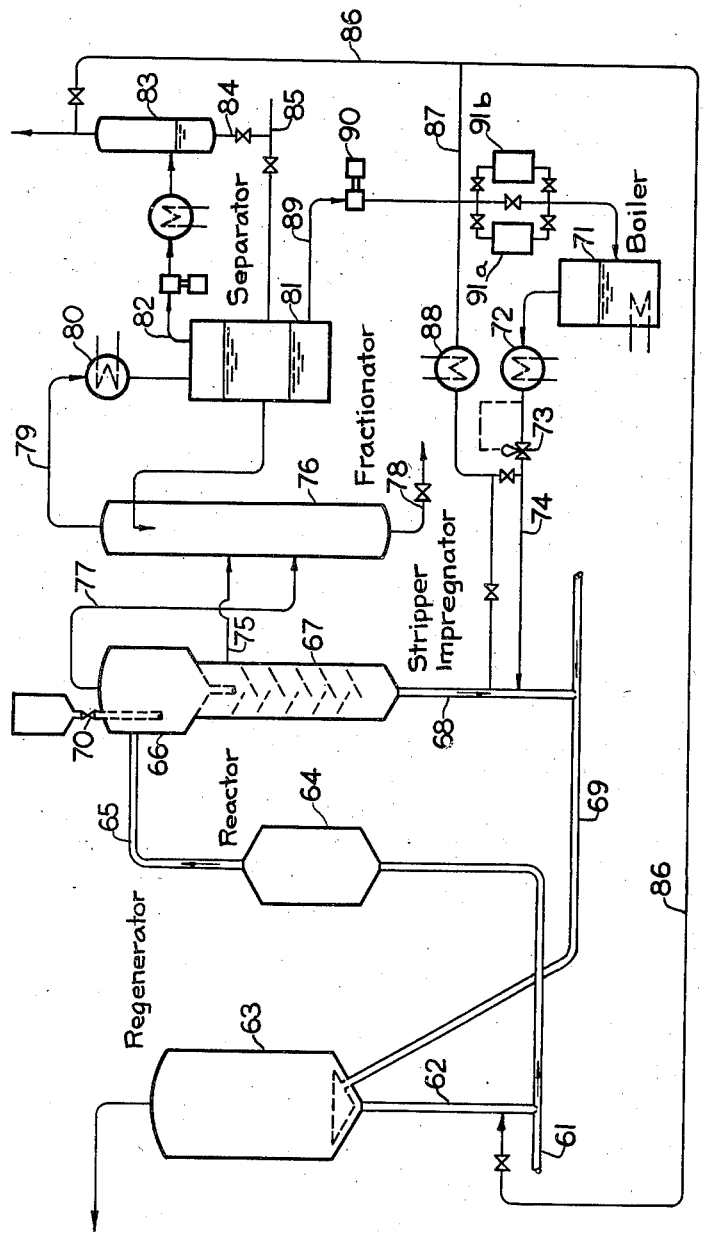
Figure IV
Inventors: William A. Bailey Jr.
James Burgin
By their Attorney: C. J. Ott Patented Sept. 17, 1946

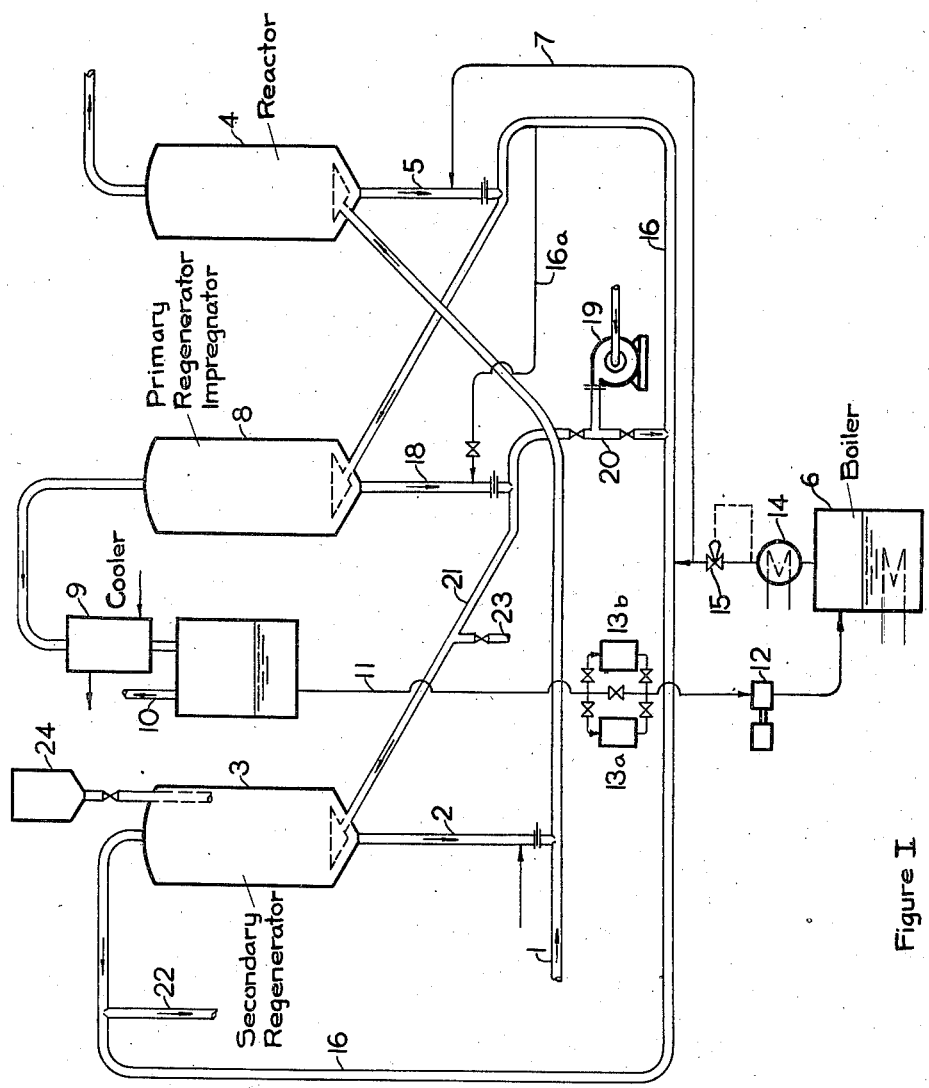
Figure I

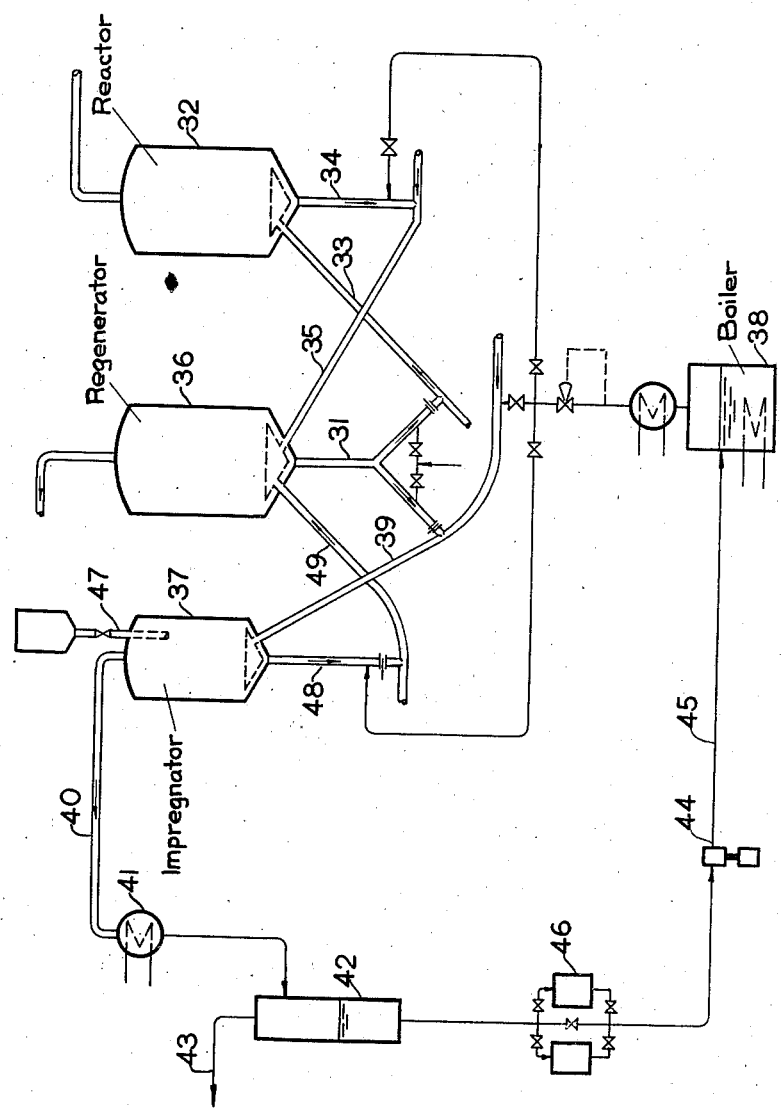
Figure II.

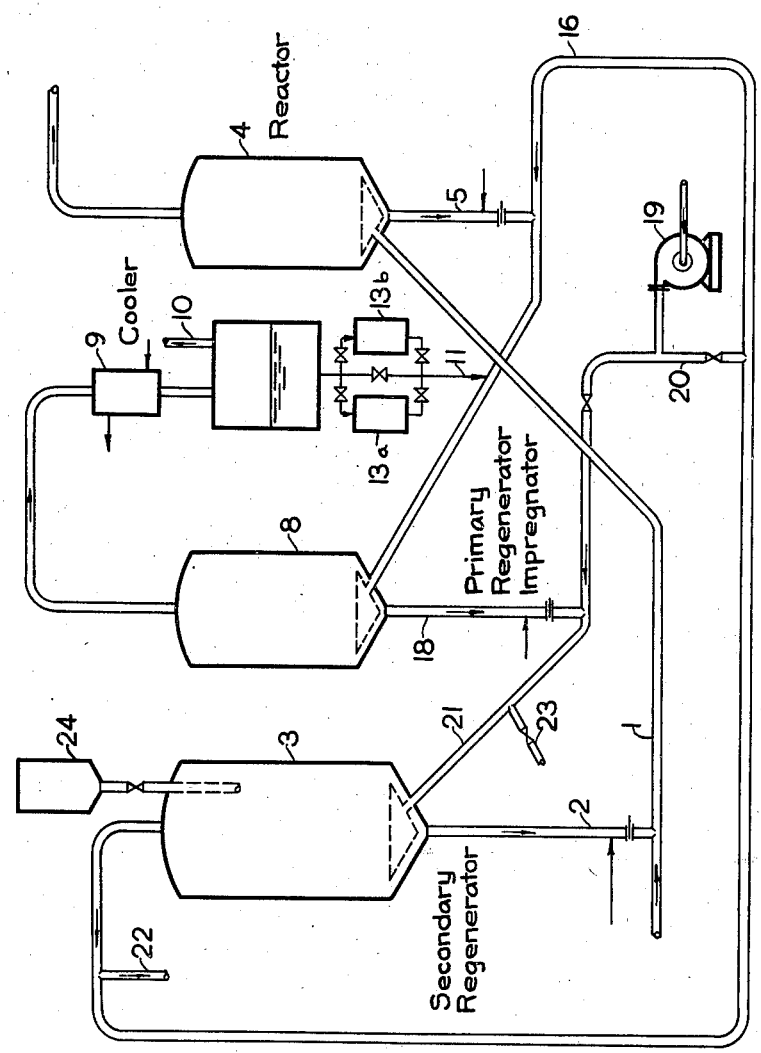
Figure III.

2,407,914

UNITED STATES PATENT OFFICE 2,407,914

CATALYTIC CONVERSION OF HYDROCARBONS AND THE PREPARATION OF CATALYSTS THEREFOR

William A. Bailey, Jr., Wilmington, and James Burgin, Oakland, Calif., assignors to Shell Development Company, San Francisco, Calif., a corporation of Delaware Application August 22, 1944, Serial No. 550,632

18 Claims. (Cl. 196—52)

This invention relates to a method for the production of boric oxide catalysts suitable for use in effecting various conversions. A specific embodiment of the invention relates to the production of such catalysts in situ in a fluid catalyst system wherein and while the catalyst is being used. A further embodiment of the invention relates to an improved method for carrying out various catalytic conversions, such in particular as the catalytic treatment of hydrocarbon oils, in fluid catalyst systems while maintaining a desired catalytic efficiency by the continuous replacement of a portion of the catalyst with fresh catalyst formed in situ.

Various catalysts consisting essentially of suitable base materials promoted with minor but appreciable amounts of boric oxide have been suggested for catalyzing various reactions. In many cases certain of these catalysts have been found to afford advantages. These catalysts have been prepared by incorporating a compound of boron decomposable to boric oxide by heat with the remaining catalyst components at various stages of the catalyst preparation, followed by a final heat treatment to convert the boron compound to boric oxide. The most commonly used and most practical boron compound is boric acid; it has been incorporated either by direct mixing with a suitable hydrous oxide gel or by impregnating a suitable adsorptive support with a hot solution of boric acid. The first of these methods has the disadvantage that it is difficult to control the density of the finished catalyst and the disadvantage that it is difficult to control the concentration of boric oxide (due to the fact that an unpredictable part of the boric acid incorporated is lost during the subsequent steps of the preparation). The second method has the disadvantage that only about half of the boric oxide in the finished catalyst is adsorbed and the remainder is absorbed. Neither of these methods lends itself to the preparation of the catalyst in the plant where it is used.

The present invention provides a method whereby superior boric oxide catalysts may be conveniently produced in a more advantageous manner. It provides a method whereby the concentration of boric oxide and the density of the finished catalyst can be easily and positively controlled. It also affords a method whereby the catalyst can be produced continuously and, if desired, in the same plant where it is used. Furthermore, it provides a new and improved method for effecting catalytic conversions in fluidized catalyst systems wherein any desired catalytic efficiency may be maintained by the continuous replacement of a portion of the catalyst with fresh catalyst formed in situ.

The activity of the boric oxide catalysts of the type in question depends to a large extent upon a large and suitable available surface. Thus, these catalysts, as freshly prepared, generally have an available surface of over 100 square meters per gram, preferably over 150 square meters per gram, and frequently in the order of 200–400 square meters per gram. Since the boric oxide contributes little, if any, to the extent of the available surface, the desired surface area is obtained by the use of selected base materials. There are numerous materials available affording a large surface. However, the catalytic properties of the catalysts also depend somewhat upon the composition and/or surface structure of the base material and all materials having a large available surface are not equally suitable. The catalysts are prepared, according to the present invention with base materials consisting predominantly of alumina. Aluminas, it is found, form with boric oxide particularly desirable combination catalysts. The base may consist essentially of alumina, in which case any of the available aluminas having a large surface (for instance above about 90–100 square meters per gram) may be used. Suitable aluminas, for example, are selected activated bauxites, the crystalline adsorptive aluminas and the various so-called alumina gels which have been activated to render them adsorptive. Also the base material may consist predominantly of aluminas and contain minor amounts of other difficultly reducible metal oxides such as the oxides of silicon, magnesium, zirconium, beryllium, titanium, thorium, tin, and bismuth or mixtures of these. In general these oxides are used in concentrations between about 2 and 30%. Higher concentrations can sometimes be used, but, in general, higher concentrations give very poor catalysts and are undesirable. A particularly suitable base material, for example, consists essentially of alumina blended with between about 2 and 15% of silica. Such alumina-silica blends or composites may be prepared in various ways. One suitable method is, for example, to mix the required amount of sodium silicate with precipitated aluminum hydroxide, followed by precipitation of the silica, washing, drying, etc. Another suitable method is by co-precipitation of the hydrous oxides. Another suitable method is to homogenize a mixture of the separately precipitated hydrous oxides. In general these various multi-component bases may be prepared using the methods and techniques described in the various patents relating to the preparation of the various multi-component silica-base catalysts for catalytic cracking if due allowance is made for the fact that the present catalysts consist predominantly of alumina.

These base materials may furthermore contain small amounts of alkali metal compounds such as alkali metal silicates, or small amounts of stabilizers such as the oxides of calcium, strontium or barium, or small amounts of promoters such as a few tenths of a percent of an oxide of chromium, molybdenum, or tungsten. These and similar materials are, however, either present as impurities or are added in small amounts for special purposes and are ordinarily absent.

For many applications of the present catalysts the density is important. The density of the present catalysts may be easily and positively controlled by the choice of base material. These base materials can be prepared with any desired density within a wide range by controlling such factors as the concentration of the precipitant solutions, the temperature of precipitation, the pH of the precipitation, aging, etc., in the known manners. Thus, for example, when preparing boric oxide catalysts for the cracking and related conversions of hydrocarbon oils a base material having a bulk density between about 0.6 and 1 and preferably about 0.8–0.95 is most suitable. The bulk density of the material is defined as the weight in grams of one cubic centimeter of the material in the form of 8–14 mesh granules and may be determined by weighing the 8–14 mesh granules contained in a 100 cc. graduate. In general the bulk density is about 0.5 times the actual density of the particles.

The base materials are usually heated to remove part of the combined and/or adsorbed water and provide a large available surface. This dehydration may be carried substantially to completion. However, catalysts which are superior in most respects are produced if a small amount of bound water (for instance between about 2% and 10%) is allowed to remain. When the water remains the alumina is probably present largely in the form of the monohydrate.

The above described base materials when combined with effective amounts of boric oxide produce catalysts which can be used to accelerate a variety of reactions. The activity, efficiency, and to some extent the selectivity of the catalysts are however also determined by the concentration of boric oxide. For dehydrogenation the optimum concentration of boric oxide is found to be about $2.9 \times 10^{-4}$ grams per square meter of available surface. However for most other reactions the optimum concentration of boric oxide is about $6 \times 10^{-4}$ grams per square meter of surface. This last concentration corresponds approximately to the amount of boric oxide required to form a mono-molecular layer on the total available surface. The activity vs. concentration of boric oxide curves are, however, fairly flat near the optimum and fall off more sharply as the concentration departs from optimum. Consequently a fair range of concentration near the optimum can be used without serious loss of activity. Thus, for example, suitable concentrations of boric oxide for cracking catalysts are between about $4 \times 10^{-4}$ and $10 \times 10^{-4}$ grams per square meter of surface. In the case of a base material having an available surface of about 200 square meters per gram this corresponds to between about 8% and 17% $B_2O_3$.

The above-described base materials are impregnated with the desired amounts of boric oxide according to the method of the present invention by treating the base material under special conditions with a mixture of steam and vapors of boric acid. The above-described base materials generally adsorb water vapor readily and are generally excellent dehydrating agents. It has been found, however, that at elevated temperatures these materials adsorb boric acid vapors selectively from steam. It has further been found that by treating these aluminous base materials with steam containing the proper concentrations of boric acid under suitable conditions, substantially the optimum concentration of boric oxide may be incorporated in an adsorbed state. Boric acid, as is known, is volatile to a small degree with steam. Thus, for example, steam at 109° C. and atmospheric pressure and at equilibrium with solid $H_3BO_3$ contains about 0.28% $H_3BO_3$. By increasing the temperature of the steam the equilibrium concentration of boric acid is increased, but the rate of vaporization of the boric acid is slowed down to such an extent that it is difficult to obtain equilibrium except upon prolonged contact. This is due to the facts that at temperatures above about 140° C. $H_3BO_3$ is unstable and reverts to $HBO_2$ (which has a much lower vapor pressure) and equilibrium is reached through the slow hydration reaction, $HBO_2(s) + H_2O(g) \rightarrow H_3BO_3(g)$. At temperatures below about 140° C. the boron in the vapors exists almost entirely as $H_3BO_3$. At higher temperatures the boron exists in the vapors largely as $HBO_2$.

While it is difficult to obtain high concentrations of boric acid vapors in steam by passing steam at high temperatures in contact with solid boric acid high concentrations may be produced by the evaporation of suitable solutions of boric acid under pressure. Thus, a solution of boric acid of the desired composition of the vapors may be continuously pumped into a boiler. If the rate of evaporation is adjusted to maintain a constant level in the boiler the composition of the vapors is the same as that of the liquid charge. By using suitable pressures and temperatures almost any desired concentration of boric acid in the steam may be obtained. Since boric acid tends to deposit from the steam if the temperature is lowered and since it is not desired to contact the steam-boric acid vapors with the base at high pressures, it is desirable to superheat the vapors and then to reduce the pressure, for instance by passing the vapors from the boiler first through a super heater and then through an expansion valve. In practice it has been found desirable to maintain the boiler at a pressure of at least 4.5 atmospheres to avoid the possible presence of solid $H_3BO_3$, $HBO_2$ or $B_2O_3$ in the boiler. Also it is desirable, but not essential, to limit the concentration of boric acid in the feed to the boiler to below about 3% by weight.

The concentration of boric acid in the steam required to incorporate an effective amount of boric oxide in the described aluminous base materials depends primarily upon the pressure of the steam and to a lesser extent upon the temperature at which the impregnation is carried out. [Since according to the present process the impregnation is carried out at temperatures above about 140° C., the boron in the vapors is generally largely in the form of meta boric acid ($HBO_2$). For purposes of calculations, etc., the concentrations of boric acid are hereinafter expressed in terms of $HBO_2$ even though under some conditions a considerable portion may actually exist as $H_3BO_3$.] Thus, it has been found that the minimum concentration of boric acid in the steam required to give various concentrations of $B_2O_3$ in the catalyst is a function of the ratio of the partial pressures of $HBO_2$ and steam, and more particularly a function of the expression $P_{HBO2}/(P_{H2O})^{1.7}$. Thus, for example, if the impregnation is carried out at 565° C., the minimum values of the expression $P_{HBO2}/(P_{H2O})^{1.7}$ corresponding to various concentrations of $B_2O_3$ in the catalyst are approximately as shown in the following table.

Table I

| Concentration of $B_2O_3$ in catalyst in grams per square meter of surface | Ratio—$P_{HBO2}/(P_{H2O})^{1.7}$ (pressures in millimeters Hg) |
|---|---|
| 2.2×10⁻⁴ | 0.3×10⁻⁵ |
| 3.3×10⁻⁴ | 0.75×10⁻⁵ |
| 4.4×10⁻⁴ | 1.25×10⁻⁵ |
| 5.5×10⁻⁴ | 2.5×10⁻⁵ |
| 6.0×10⁻⁴ | 3.1×10⁻⁵ |
| 6.6×10⁻⁴ | 4×10⁻⁵ |
| 7.7×10⁻⁴ | 7.2×10⁻⁵ |
| 8.8×10⁻⁴ | 13.8×10⁻⁵ |
| 9.45×10⁻⁴ | 18.3×10⁻⁵ |

Using these figures or a curve plotted therefrom, the minimum concentrations of boric acid vapors for any given steam pressure and concentration of boric oxide in the catalyst can readily be determined. These ratios of $P_{HBO2}/(P_{H2O})^{1.7}$ are the minimum ratios which will afford a catalyst of the corresponding concentration of $B_2O_3$. If desired, the ratio of $P_{HBO2}/(P_{H2O})^{1.7}$ may be higher than the minimum and the desired concentration of $B_2O_3$ in the catalyst controlled by limiting the time of impregnation. As will be apparent from the further details of the process of the invention, it is sometimes advantageous to operate with the above minimum ratio and at other times it is advantageous to use higher ratios.

The impregnation may be carried out at temperatures ranging from about 140° C. to about 590° C. When affecting the impregnation as a separate operation, temperatures between about 140° C. and 300° C. may be advantageously employed. When effecting the impregnation in a fluid catalyst system as described below, somewhat higher temperatures, for instance 300° C.–590° C., may be more advantageous. At lower temperatures the above-given minimum ratios of $P_{HBO2}/(P_{H2O})^{1.7}$ are reduced somewhat. However, the above-given ratios or higher ratios may be suitably employed.

From the above it is seen that mixtures of steam and boric acid vapors containing any desired concentration of boric acid may be conveniently produced and positively controlled. By contacting suitable base materials of the class described with these steam-boric acid mixtures under the described conditions excellent catalysts having any desired concentration of boric oxide may be produced. The concentration of boric oxide in the catalyst may be controlled by adjusting the composition and/or pressure of the vapors, or to a certain extent by the temperature, or by using a suitable steam-boric acid mixture and limiting the time of impregnation.

*Example I*

An adsorptive crystalline alumina containing about 3% $SiO_2$ was impregnated by treating it for 16 hours at atmospheric pressure and at 305° C. with steam containing 1.8% $B_2O_3$ (2.3% b. w. $HBO_2$). The resulting catalyst contained 6.9% b. w. $B_2O_3$ and had a bulk density of about 0.93. This catalyst was used for the catalytic cracking of West Texas gas oil under the following conditions:

| | |
|---|---|
| Temperature °C | 500 |
| Liquid hourly space velocity | 4.0 |
| Process period min | 60 |
| Pressure atm | 1 |

(Liquid hourly space velocity is defined as the volume of reactant material measured as a liquid contacted with a unit volume of catalyst bed in a period of one hour.)

The following products (per cent by weight of the charge) were obtained.

| | Per cent |
|---|---|
| Gas (to 25° C.) | 10.0 |
| Gasoline (25–205° C.) | 23.2 |
| Cycle oil (205° C.+) | 66.1 |
| Carbon | 0.7 |
| Loss | 0 |

The above-described base materials, like most materials having a large available surface, are severely damaged if contacted for any length of time with steam at high temperatures, and even relatively mild treatment with steam is in some cases appreciably harmful. This harmful effect of steam is largely prevented by the presence of the boric acid in the steam and/or the boric oxide in the catalyst. It may be noticeable nevertheless with many of the base materials if the impregnation is carried out at high temperatures (for instance 300° C. or above) and particularly if the impregnation is carried out with steam at normal or superatmospheric pressure. This disadvantage is overcome and other advantages are realized, according to a preferred embodiment of the invention by employing a partial pressure of steam+boric acid below one atmosphere. This may conveniently be done without the use of vacuum by employing a suitable diluent such as air, flue gas, gaseous hydrocarbons, or the like.

*Example II*

An adsorptive alumina gel containing about 10.1% water and about 4–5% b. w. of silica blended therein was treated for 30 hours at atmospheric pressure and at 305° C. with a mixture of steam and boric acid vapors containing 1.8% b. w. $B_2O_3$ (2.3% b. w. $HBO_2$), which mixture had been diluted with nitrogen to give a partial pressure of steam of 190 mm. The resulting catalyst contained 19.0% $B_2O_3$ and had a bulk density of about 0.83. This catalyst was used to crack West Texas gas oil under the following conditions.

| | |
|---|---|
| Temperature °C | 500 |
| Liquid hourly space velocity | 4.0 |
| Process period min | 60 |
| Pressure atm | 1 |

The following products (per cent by weight on the charge) were obtained.

| | Per cent |
|---|---|
| Gas (to 25° C.) | 19.3 |
| Gasoline (25–205° C.) | 28.6 |
| Cycle oil (205° C.+) | 48.6 |
| Carbon | 2.1 |
| Loss | 1.4 |

*Example III*

An adsorptive crystalline alumina having a surface of about 180 square meters per gram was treated for 43 hours at atmosphere pressure and at a temperature of 305° C. with a mixture of steam and boric acid vapors containing 1.5% b. w. $B_2O_3$ (1.9% b. w. $HBO_2$) which mixture had been diluted with nitrogen to give a partial pressure of steam of 190 mm. The resulting catalyst contained 12.3% b. w. $B_2O_3$ and had a bulk density of about 0.90. This catalyst was used for the cracking of West Texas gas oil under the following conditions:

| | |
|---|---|
| Temperature °C | 500 |
| Liquid hourly space velocity | 4.0 |
| Process period min | 60 |
| Pressure atm | 1 |

The following products (per cent by weight on the charge) were obtained:

| | Per cent |
|---|---|
| Gas (to 25° C.) | 13.9 |
| Gasoline (25–205° C.) | 25.5 |
| Cycle oil (205° C.+) | 59.0 |
| Carbon | 1.2 |
| Loss | 0.4 |

The use of such a diluent is advantageous in several respects. It has been found, in accordance with the ratio given above, that as the amount of diluent is increased, considering a constant total pressure, the minimum concentration of boric acid in the steam required to give a chosen concentration of boric oxide in the catalyst is greatly reduced. For example, if the impregnation is carried out at a temperature of about 565° C. at a partial pressure of steam of about 1 atmosphere, a minimum of about 0.92% b. w. $HBO_2$ is required in the steam to impregnate a base material having a surface area of about 190 square meters per gram with about 12% $B_2O_3$; if the partial pressure of the steam is reduced to about 380 mm. (½ atmosphere) by the use of air or a similar diluent the minimum concentration of $HBO_2$ in the steam is reduced to about 0.5%. Thus, by using a diluent, quite low concentrations of boric acid in the steam may be used. By using low partial pressures of steam the abovementioned damage to the base materials may be substantially avoided even when effecting the impregnation at temperatures above 500° C. This therefore allows the impregnation to be carried out at high temperatures which, in turn, allows the impregnation to be conveniently carried out in fluid catalyst systems wherein the catalyst is used. Thus, in fluid catalyst systems wherein the catalyst is used in a finely divided state and continuously cycled through a reaction zone and a regeneration zone it becomes possible to continuously or intermittently add a portion of the base material directly to the bulk of the catalyst in the system, while withdrawing a like portion of partially spent catalyst, and effect the impregnation at a convenient point in the cycle by the injection of the described diluted steam-boric acid mixture. By this means it is possible to carry out various conversions continuously with a constant catalytic efficiency.

This improved method of operation will be described in more detail in connection with the flow diagrams in the attached drawings wherein there are shown, by means of conventional figures not drawn to scale, the more important features of certain illustrative fluid catalyst systems adapted for operation according to the methods of the invention.

Figure I illustrates a fluid catalyst system employing two bottom-draw-off fluid catalyst regenerators arranged for a two-step regeneration method.

Figure II illustrates a fluid catalyst system employing a bottom-draw-off fluid catalyst regenerator and a bottom-draw-off fluid catalyst impregnator working on a side stream principle.

Figure III illustrates a system which does not require a boric acid-steam boiler.

Figure IV illustrates a system employing a bottom-draw-off fluid catalyst regenerator and a hindered-settling reactor.

These various systems may be used to carry out a wide variety of vapor phase reactions, conversions and treatments wherein organic vapors are contacted with the finely divided boric oxide catalyst at an elevated temperature, and wherein a portion of the catalyst is continuously recycled through a regenerator to remove carbonaceous deposits. They are particularly adapted, for example, for effecting various reactions, conversions and treatments of hydrocarbon vapors. Since one of the important applications of fluid catalyst systems is for the catalytic cracking of hydrocarbon oils, and since the present catalysts are particularly suited for this purpose, the various systems and some of their more important modifications will be described in connection with the catalytic cracking of hydrocarbon oils to produce gasoline and gaseous products. Throughout the description the base material used to prepare the catalyst will be assumed to be an aluminous base of the type described in Example II.

Referring to Figure I, the oil to be cracked is charged either in a liquid or vapor state by line 1. This oil picks up the required amount of hot regenerated finely divided catalyst from the standpipe 2 of a fluid catalyst regenerator 3 and the mixture is passed to a fluid catalyst reactor 4 wherein the oil is contacted with a bed of the fluidized catalyst and is cracked in the vapor state. The cracked oil vapors pass out from the top of the reactor to be treated in various known manners. The cracking may be carried out under any of the conventional conditions. One typical set of conditions is, for example,

| | |
|---|---|
| Temperature °F | 980 |
| Pressure p. s. i. g | 12 |
| Liquid hourly space velocity | 1.2 |

(The catalyst/oil weight ratio is defined as the ratio of the weight of catalyst to the weight of oil in the catalyst-oil mixture charged to the reactor.)

Catalyst/oil weight ratio _____ 18:1

A portion of the partially spent catalyst is continuously withdrawn from reactor 4 by a standpipe 5. If desired a mixture of steam and boric acid vapors generated in boiler 6 may be introduced into standpipe 5 by line 7 to flush the catalyst therein of the major portion of the more easily removable occluded oil and oil vapors. The partially spent catalyst withdrawn through standpipe 5 is picked up and carried to a primary regenerator-impregnator 8 by a stream of steam and boric acid vapors generated in boiler 6, which mixture is diluted with partially spent regeneration gas from the secondary regenerator 3. In the primary regenerator-impregnator 8 the partially spent catalyst is stripped of most of the additional occluded hydrocarbon material; also some of the more easily combustible carbonaceous deposits may be burned; and the alumina base, added as hereinafter described, is impregnated with boric oxide to produce fresh active catalyst in situ. The temperature in the primary regenerator-impregnator 8 may be regulated by controlling the oxygen concentration of the gas mixture. In general this temperature will be below that in the secondary regenerator 3. The rate of flow of the gas mixture is sufficient to maintain the catalyst in the primary regenerator-impregnator in a fluidized state. The effluent gas from the primary regenerator-impregnator contains steam and unadsorbed boric acid vapors. This effluent gas may be passed through a suitable cooler 9 to condense out an aqueous solution of boric acid. The uncondensed gas is withdrawn via line 10.

The aqueous boric acid solution is recycled by line 11 and pump 12 to the boiler 6. In order to maintain the desired concentration of boric acid in the aqueous solution a part of the recycled solution may be passed through one of two saturators, 13a or 13b, containing boric acid. One saturator can be filled, etc., while the other is in use. The steam-boric acid vapor mixture generated in boiler 6 is advantageously passed through a superheater 14 before reducing the pressure by a reduction valve 15. The superheated steam-boric acid vapor mixture containing the desired concentration of boric acid vapors is passed via line 16 into the primary regenerator-impregnator 8. A small portion may be diverted via line 16a to the standpipe 18 of the primary regenerator-impregnator 8 to keep the catalyst therein in a free-flowing condition.

Air for regenerating the catalyst is charged to the system by pump 19. A portion of the air may be passed into line 16 via line 20 to control the oxygen concentration of the gas stream to the primary regenerator-impregnator 8. The remainder of the air picks up partially regenerated catalyst from standpipe 18 and carries it via line 21 to the secondary regenerator 3. In the secondary regenerator 3 the major portion of the deposited carbonaceous material is burned from the catalyst. In general, the temperature in the secondary regenerator is in the order of 1100° F. to 1400° F. The partially spent regeneration gases are removed from the secondary regenerator via line 16. Part of these gases are recycled to serve as a diluent for the steam-boric acid vapor mixture and the remainder is withdrawn from the system via line 22.

During operation of the process there is always some loss of the finely divided catalyst. Thus, a small amount of the catalyst is usually carried out of the system with the vapors and gases leaving the system via line 22. In general, if this loss is made up by the addition of a like amount of fresh catalyst the activity of the catalyst in the system may be retained at a satisfactory steady state. If it is desired to shorten the average residence time of the catalyst in the system, an additional amount of the catalyst may be continuously or intermittently removed from the system, for instance via line 23.

In order to maintain the catalyst in the system at a desired activity for an extended length of time, an amount of fresh catalyst equivalent to the amount withdrawn is continuously or intermittently produced in the system. In the system illustrated in Figure I the aluminous base material for this purpose is introduced into the secondary regenerator by means of a suitable feed arrangement 24. When feeding the aluminous base material into the secondary regenerator, it is not contacted with the steam-boric acid vapor mixture until after it has first passed through the reactor. This is advantageous since the fresh aluminous base material adsorbs a certain amount of oil in the reactor, and this, it appears, tends to further protect it against damage by the steaming treatment in the primary regenerator.

The system illustrated in Figure I also affords certain other advantages which may not be apparent at first sight. In this system, the vapor velocity in the primary regenerator-impregnator need be only sufficient to maintain the catalyst in a fluidized state. Loss of catalyst by carryover from the primary regenerator may therefore be reduced and retained at a minimum. Furthermore, since a substantial part of the partially spent regeneration gases from the secondary regenerator 3 is passed to the primary regenerator-impregnator 8, loss of catalyst by carryover with this gas is substantially reduced. This allows relatively high gas rates to be used in the secondary regenerator. Furthermore, since the major portion of the hydrogen-rich, easily combustible deposits are removed from the spent catalyst in the primary regenerator-impregnator 8, little steam is produced in the secondary regenerator 3. It is found that by reducing the partial pressure of water vapor in the secondary or high temperature regenerator the catalyst life may, in general, be prolonged. Also it is found that small amounts of adsorbed water in the catalyst often exert a temporary poisoning effect upon the catalyst giving rise to a short induction period. By keeping the partial pressure of steam in the secondary regenerator at a minimum this disadvantage is also avoided. Furthermore, when the partial pressure of water vapor in the gases in the secondary regenerator is low there is less tendency to remove boric oxide from the catalyst by the regeneration gases.

The system illustrated in Figure II is similar to that illustrated in Figure I in several respects. It will therefore be described more briefly. The oil to be cracked picks up freshly regenerated catalyst from one leg of the standpipe 31 and the mixture passes to the reactor 32 via line 33. The partially spent catalyst from the reactor, withdrawn via standpipe 34, is picked up by a stream of air and carried via line 35 to the regenerator 36 wherein carbonaceous deposits are removed by burning. A portion of the hot regenerated catalyst is also continuously withdrawn from the other leg of standpipe 31 and is picked up and carried to an impregnator 37 by the described mixture of steam-boric acid vapors from boiler 38 and air or other inert diluents via line 39. The gases leaving the impregnator 37 via line 40 pass through a cooler 41, separator 42, and the uncondensed portion thereof leaves the system via line 43. The aqueous solution of boric acid is then cycled back to the boiler 38 via pump 44 and line 45. A portion of the solution may be passed through a saturater 46 as described in connection with Figure I.

By means of a hopper and feeding mechanism 47 fresh aluminous base is added to the impregnator in an amount equivalent to the amount of catalyst withdrawn and/or lost from the system. The catalyst mixture comprising the freshly prepared catalyst is withdrawn from the impregnator 37 by standpipe 48. This material is picked up by a stream of air and passed via line 49 to the regenerator 36. This system has the advantage that the impregnation may be carried out at a relatively low temperature. The circulation of a part of the catalyst through the regenerator and impregnator therefore affords an excellent means of removing the excess regeneration heat and controlling the regeneration temperature.

The system illustrated in Figure III is similar to that illustrated in Figure I except that the heat in the hot catalyst withdrawn from the reactor is used to vaporize the aqueous boric acid solution thereby eliminating the boiler. Thus the aqueous boric acid solution is fed directly into the mixture of partially spent catalyst and partially spent flue gas passing into the primary regenerator-impregnator via line 16.

As noted above, the presence of adsorbed oil vapors in the catalyst appears to protect it to a considerable extent against possible damage by the action of steam. This protective effect is utilized to better advantage in the system illustrated in Figure IV. Referring to Figure IV, the oil to be cracked is charged via line 61. This oil picks up the required amount of hot freshly regenerated catalyst from the standpipe 62 of regenerator 63 and carries it into and through a hindered settling type reactor 64. The oil vapors carrying the catalyst in suspension leave the reactor overhead via line 65 and pass to a separator 66. Here the oil vapors are separated from the catalyst. The catalyst flows downward through a stripping-impregnating chamber 67 provided with suitable baffles, and is finally withdrawn from the bottom by pipe 68. The catalyst withdrawn via pipe 68 is then picked up by a stream of regeneration gas and carried via line 69 to the regenerator 63.

In order to maintain the efficiency of the catalyst at a desired level fresh aluminous base material in an amount equivalent to the amount of catalyst withdrawn or lost from the system is fed to the system from the hopper by the feeding mechanism 70. This base material mixes with the catalyst and passes down through the impregnating chamber 67. The mixture of steam and boric acid vapors for impregnating the aluminous base is generated in a boiler 71. This mixture is preheated in heater 72, expanded through reducing valve 73 and then passed via lines 74 and 68 up through the impregnation chamber 67. In order to maintain the partial pressure of the steam plus boric acid vapors below one atmosphere the mixture is diluted with light hydrocarbon gas obtained as hereinafter described. The mixture of steam, boric acid vapors and light hydrocarbon gases passing up through chamber 67 not only impregnate the added aluminous base material thereby forming fresh catalyst in situ, but also serve to strip the partially spent catalyst of occluded oil. The mixture of vapors from the chamber 67 pass via line 75 to a fractionator 76 wherein they are fractionated along with the cracked vapors introduced via line 77 from the separator 66. Heavy oil, including uncracked products, are withdrawn from the fractionator via line 78 and the lighter products including the steam, residual boric acid vapors and light gases pass overhead via line 79. The mixture passes through a cooler 80 to a separator 81. Uncondensed vapors are withdrawn from separator 81 via line 82. These vapors are compressed and cooled and then passed to a second separator 83. The light gasoline is withdrawn via line 84 along with the heavier gasoline from separator 81 issuing via line 85. The light hydrocarbon gases are withdrawn from the top. These gases may be further compressed and sent to a suitable adsorber unit, not shown. A portion of the light gases is recycled via lines 86, 87 and heater 88 to serve as diluent for the steam-boric acid vapor mixture as hereinbefore described. A further regulated portion may also be cycled via line 86 to standpipe 62 to replace the air in the freshly regenerated catalyst being withdrawn. The lowest layer in separator 81 is an aqueous solution of boric acid. This solution is fed via line 89 and pump 90 to the boiler 71. A portion of the solution may be by-passed through one of the boric acid saturators 91a and 91b, as hereinbefore described, to maintain a desired boric acid concentration in the feed to boiler 71.

In the system illustrated in Figure IV the impregnation takes place at a temperature equal to or lower than the reaction temperature and in the presence of hydrocarbon vapors. Thus, the maximum protection of the catalyst and base material against damage by the action of steam is obtained. Also, since the stripping action is very efficient, little steam is formed in the regenerator and the catalyst is less apt to show an induction period. An induction period is particularly undesirable in systems of this type since the average residence time in the reactor is comparatively short. The improvement in respect to the induction period is also in part due to the use of hydrocarbon gases instead of steam to displace the air from the regenerated catalyst in standpipe 62.

It is fully realized that the systems illustrated in the attached figures may be modified in many particulars. For instance hindered settling type fluid catalyst regenerators may be substituted for the bottom-draw-off type regenerators illustrated. Also the fractionation and recovery system may require modifications in order to make them more suited for particular operations. These and similar modifications which will be apparent to those skilled in the art will be recognized as applications of the more basic features of the invention.

We claim as our invention:

1. Process for the preparation of boric oxide catalysts which comprises continuously feeding to a boiler an aqueous solution of boric acid, continuously generating in said boiler and withdrawing a steam-boric acid vapor mixture, superheating said mixture, expanding said superheated mixture, passing the superheated and expanded mixture up through a bed of an adsorptive base material consisting predominantly of alumina maintained at a temperature between about 140° C. and 590° C., cooling the exit vapors to condense an aqueous boric acid solution, adjusting the concentration of boric acid in said condensed boric acid solution, and feeding said solution to said boiler, thereby to impregnate said adsorptive aluminous base material with an effective amount of boric oxide.

2. Process according to claim 1 in which the steam boric acid vapor mixture is generated at a pressure above about 4.5 atmospheres.

3. Process according to claim 1 in which the solution of boric acid feed to said boiler is adjusted to contain somewhat less than 3% boric acid.

4. Process according to claim 1 in which the superheated steam-boric acid vapor mixture is expanded into such an amount of an inert gas that the partial pressure of steam plus boric acid is less than 1 atmosphere.

5. Process according to claim 1 in which the aluminous base material contains adsorbed carbonaceous material.

6. Process for the preparation of boric oxide catalysts which comprises passing through an impregnation zone maintained at a temperature between about 140° C. and 590° C. a stream of hot finely divided adsorptive base material consisting predominantly of alumina, forming a mixture of steam and boric acid vapors in said stream by the continuous addition of an aqueous solution of boric acid, removing vapors of steam and boric acid from said impregnation zone, cooling said vapors to condense an aqueous solution of boric acid, adjusting the concentration of boric acid in said aqueous solution, and adding said solution to the stream of said aluminous material as above specified.

7. Process according to claim 6 in which the stream of aluminous base material is carried to said impregnation zone by an inert gas.

8. Process according to claim 6 in which the concentration of said boric acid solution is adjusted to somewhat below 3% boric acid.

9. Process according to claim 6 in which the aluminous material is a mixture of partially spent catalyst and adsorptive base material containing adsorbed carbonaceous material.

10. Method for the preparation of boric oxide catalysts which comprises passing steam containing vapors of boric acid in contact with an adsorptive base material consisting predominantly of alumina at a temperature between about 140° C. and 590° C. and under such conditions that the combined partial pressures of the steam and boric acid vapors is less than 1 atmosphere until the base material contains the equivalent of about $6 \times 10^{-4}$ grams of $B_2O_3$ per square meter of available surface.

11. Method for the preparation of boric oxide catalysts which comprises passing steam containing vapors of boric acid in contact with an adsorptive base material having an available surface of at least about 150 square meters per gram and consisting predominantly of alumina at a temperature between about 140° C. and 590° C. and under such conditions that the combined partial pressures of the steam and boric acid vapors is less than 1 atmosphere to incorporate in said base material the equivalent of at least 8% of $B_2O_3$.

12. Method for the preparation of boric oxide catalysts which comprises impregnating an adsorptive base material consisting predominantly of alumina with an effective amount of boric oxide by means of a gaseous mixture comprising steam and vapors of boric acid at a temperature between about 140° C. and 590° C. and under conditions chosen so that the combined partial pressures of steam and boric acid vapors is less than 1 atmosphere.

13. Method for the preparation of boric oxide catalysts which comprises impregnating an adsorptive base material consisting essentially of a blend of alumina and silica containing between about 2 and 15% silica with an effective amount of boric oxide by means of a gaseous mixture comprising steam and vapors of boric acid at a temperature between about 140° C. and 590° C. and under conditions chosen so that the combined partial pressures of steam and boric acid vapors is less than 1 atmosphere.

14. In a process for the catalytic conversion of a hydrocarbon with a catalyst comprising boric oxide and alumina in a fluidized catalyst system, the improvement which comprises effecting the regeneration of the catalyst in two stages, effecting the first stage at a temperature below about 500° C. with steam containing vapors of boric acid at a partial pressure of steam below 1 atmosphere, effecting the second stage at a temperature above about 500° C. with air, and replacing a portion of the total catalyst with an adsorptive base material consisting predominantly of alumina, whereby the activity of the catalyst in the system is maintained by the formation of fresh catalyst in said first regeneration stage.

15. In a process for the catalytic conversion of a hydrocarbon with a catalyst comprising boric oxide and alumina in a fluidized catalyst system, the improvement which comprises effecting the regeneration of the catalyst in two stages, effecting the first stage at a temperature below about 500° C. with steam containing vapors of boric acid at a partial pressure of steam below 1 atmosphere, effecting the second stage at a temperature above about 500° C. with air using the partially spent regeneration gas from the second stage to dilute the steam-boric acid mixture in the first stage, and replacing a portion of the total catalyst with an adsorptive base material consisting predominantly of alumina, whereby the activity of the catalyst in the system is maintained by the formation of fresh catalyst in said first regeneration stage.

16. In a system in which a supported boric oxide catalyst is circulated through a reaction zone and a regeneration zone, the method of maintaining the activity of the catalyst in said system at a desired level which comprises substantially continuously withdrawing and discarding a minor amount of the catalyst from said system, substantially continuously adding to the catalyst in said system a minor amount of an adsorptive base material consisting predominantly of alumina, continuously passing a portion of the circulated catalyst containing said added adsorptive base material through an impregnation zone, contacting the mixture in said impregnation zone at a temperature between about 140° C. and 590° C. with steam containing boric acid vapors in a concentration at least sufficient to give approximately a monomolecular layer of boric oxide on said adsorptive base material, and combining the catalyst from said impregnation zone with the remainder of the catalyst circulated in said system.

17. Process according to claim 16 in which the steam and boric acid vapor mixture is diluted with such an amount of an an inert gas that the partial pressure of steam plus boric acid is less than 1 atmosphere.

18. Process according to claim 16 in which the adsorptive aluminous base material consists essentially of an adsorptive composite of alumina and silica containing between about 2% and 15% by weight of silica.

WILLIAM A. BAILEY, Jr.
JAMES BURGIN.